(12) United States Patent
Ramsl

(10) Patent No.: US 11,797,281 B2
(45) Date of Patent: Oct. 24, 2023

(54) MULTI-LANGUAGE SOURCE CODE SEARCH ENGINE

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 17/395,213

(22) Filed: Aug. 5, 2021

(65) Prior Publication Data

US 2023/0040412 A1   Feb. 9, 2023

(51) Int. Cl.
*G06F 8/51* (2018.01)
*G06N 20/00* (2019.01)
*G06F 8/73* (2018.01)

(52) U.S. Cl.
CPC .................. *G06F 8/51* (2013.01); *G06F 8/73* (2013.01); *G06N 20/00* (2019.01)

(58) Field of Classification Search
CPC .............. G06F 8/51; G06F 8/73; G06N 20/00
See application file for complete search history.

(56) References Cited

U.S. PATENT DOCUMENTS

| | | | | |
|---|---|---|---|---|
| 6,993,710 B1 * | 1/2006 | Coad | .......................... | G06F 8/77 |
| | | | | 715/767 |
| 10,936,827 B1 * | 3/2021 | Gupta | ...................... | G06F 40/45 |
| 2014/0331202 A1 * | 11/2014 | Fukuda | .................... | G06F 8/751 |
| | | | | 717/123 |
| 2015/0046492 A1 * | 2/2015 | Balachandran | ........... | G06F 8/36 |
| | | | | 707/772 |
| 2020/0104631 A1 * | 4/2020 | Zhang | ...................... | G06F 40/30 |
| 2021/0182031 A1 * | 6/2021 | Ye | .............................. | G06F 8/34 |
| 2022/0004365 A1 * | 1/2022 | Pujar | ...................... | G06N 3/088 |
| 2022/0138240 A1 * | 5/2022 | Bahrami | ............. | G06F 16/3332 |
| | | | | 717/120 |
| 2022/0308848 A1 * | 9/2022 | Clement | ................... | G06F 8/51 |
| 2023/0016897 A1 * | 1/2023 | Manivasagam | ........ | G06N 20/00 |

* cited by examiner

*Primary Examiner* — Wei Y Zhen
*Assistant Examiner* — Amir Soltanzadeh
(74) *Attorney, Agent, or Firm* — SCHWEGMAN LUNDBERG & WOESSNER, P.A.

(57) ABSTRACT

A machine learning model is trained to translate source code from one or more programming languages into a common programming language. The machine learning model translates source code from the other languages into the common programming language. A language embedder generates a vector for each function in the source code, all of which is now in the common programming language. A user provides a text search query which is converted by a language embedder to a vector. Based on the vector of the text search query and the vectors for the source code, search results are generated and presented in a user interface. Additional machine learning models may be trained and used to measure function complexity, test coverage, documentation quantity and complexity, or any suitable combination thereof. These measures may be used to determine which search results to present, an order in which to present search results, or both.

20 Claims, 15 Drawing Sheets

*500*

| PYTHON MAPPING TABLE | |
|---|---|
| WORD | VECTOR |
| JOIN | (0, 0.1, 0, 0.2, ...) |
| INDEX | (0.1, 0, 0.15, ...) |
| FOR | (0, 0, 0.1, 0.1, ...) |

| ENGLISH MAPPING TABLE | |
|---|---|
| WORD | VECTOR |
| DATA | (0, 0.2, 0, 0.3, ...) |
| FUNCTION | (0.15, 0, 0.1, ...) |
| PARAMETER | (0, 0.1, 0, 0.1, ...) |

| TEST COVERAGE TABLE | |
|---|---|
| PROJECT ID | COVERAGE |
| 1 | 0.9 |
| 2 | 0.1 |
| 3 | 0.5 |

*FIG. 5*

FUNCTION TABLE (500, 610)

| PROJECT ID | FUNCTION ID | IMAGE ID | CATEGORY |
|---|---|---|---|
| 1 | 101 | 1001 | STRING PROCESSING |
| 2 | 102 | 1002 | INVOICE PROCESSING |
| 3 | 103 | 1003 | DATABASE ACCESS |

COMPLEXITY TABLE (640)

| IMAGE ID | COMPLEXITY |
|---|---|
| 1001 | 8 |
| 1002 | 5 |
| 1003 | 1 |

SEARCH TABLE (670)

| FUNCTION ID | CATEGORY | COMPLEXITY | VECTOR |
|---|---|---|---|
| 101 | STRING PROCESSING | 8 | (0,0.2... |
| 102 | INVOICE PROCESSING | 5 | (.3,0.1... |
| 103 | DATABASE ACCESS | 1 | (0.1,0.2... |

*FIG. 6*

MULTI-LANGUAGE SOURCE CODE SEARCH ENGINE

TECHNICAL FIELD

The subject matter disclosed herein generally relates to evaluation of one or more source code repositories. Specifically, the present disclosure addresses systems and methods to search for source code according to search criteria and to identify projects that include similar functions, evaluate those projects, and provide recommendations for consolidation.

BACKGROUND

Developers create source code for projects to perform tasks. A later developer may be unaware of source code already created by an earlier developer and may create new source code to perform the same task, either using the same programming language or a different one. The resulting multiple sets of source code are maintained separately.

BRIEF DESCRIPTION OF THE DRAWINGS

FIGS. 5-6 are block diagrams of an example database schema, suitable for use in source code discovery and generating consolidation recommendations.

DETAILED DESCRIPTION

Figure 1:
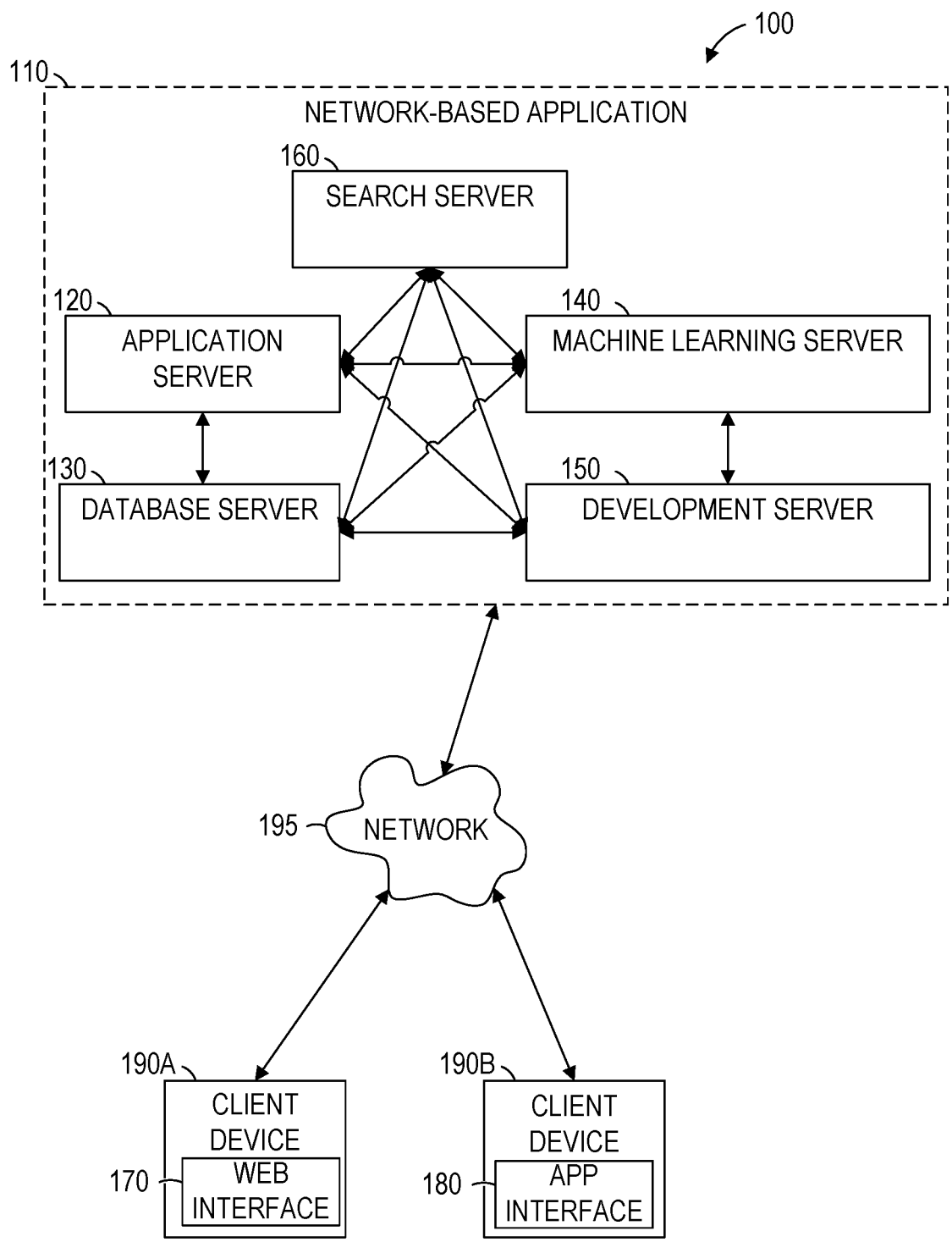
FIG. 1 is a network diagram illustrating an example network environment suitable for source code discovery and generating consolidation recommendations.

Example methods and systems are directed to providing a source code search engine that searches for source code (e.g., software projects) written in multiple programming languages. Each software project comprises source code that implements one or more functions (also referred to as methods, subroutines, and procedures). Software projects may also include documentation that describes the functionality provided or tasks performed by the software project. A software project may be deployed as an application. For example, a C software project for a web browser comprises the C source code for the web browser and the documentation for the C source code. The C source code may be compiled to generate a web browser application, which may be executed to provide web browser functionality.

Software projects may be stored in source code repositories. A repository stores multiple projects that are related in some way. For example, the repository may store software projects for a single company, store software projects written in a single programming language, store software projects addressing related tasks (e.g., email processing, image processing, or machine learning), or any suitable combination thereof.

A machine learning model is trained to translate source code from other languages (e.g., Java, C++, Ruby, Rust, Perl) into a common language (e.g., Python). A language embedder generates a vector for each function in the source code.

A second machine learning model is trained to measure complexity from ACD images. For example, the number of nodes presented in the ACD may be the complexity measure. A third machine learning model is trained to measure a completeness of test coverage for functions.

A fourth machine learning model is trained to map natural language descriptions of functionality to vectors generated from source code. For example, the training set may comprise embedding vectors generated from natural language documentation annotated with embedding vectors generated from the documented function. The documentation may also be evaluated for completeness and readability (e.g., using a Gunning fog index). As used herein, "natural language" refers to human languages such as English, German, and Chinese. By contrast, "programming language" refers to languages used to provide instructions to computers such as Python, Java, C, and R.

A user provides a text search query which is converted by a language embedder to a vector. The fourth machine learning model translates the vector for the search query to a vector suitable for comparison with vectors for functions. A similarity measure between the translated vector for the search query and the vector for the functions is used to determine which functions are the best matches for the search query. Among similar functions, functions may be prioritized as search results based on the complexity measure for the corresponding ACD images, the completeness of test coverage, the completeness of documentation, the readability of documentation, or any suitable combination thereof.

The degree of overlap in functionality provided by pairs or groups of projects may be determined by comparison of the vectors for the functions in the projects, comparison of embedding vectors for documentation for the functions in the projects, or both. Based on a high degree of overlap, consolidation may be recommended. Consolidation refers to placing all of the combined functionality in a single project and deprecating or deleting the overlapping functionality in other projects. Based on a low degree of overlap, a microservices architecture may be recommended. A microservices architecture makes use of functionality in separate applications using lightweight protocols to connect functions.

By comparison with existing methods of searching for source code, the methods and systems discussed herein improve functionality by allowing for search of multiple repositories that use different programming languages, measuring a degree of similarity between search results, using a combination of documentation, source code, and ACD images to generate search results, providing consolidation recommendations, or any suitable combination thereof. Additionally, methods and systems discussed herein reduce the level of effort expended in searching for and identifying existing source code projects with desired functionality, reducing the probability that equivalent source code will be developed again.

When these effects are considered in aggregate, one or more of the methodologies described herein may obviate a need for certain efforts or resources that otherwise would be involved in searching for source code. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for source code discovery and generating consolidation recommendations. The network environment 100 includes a network-based application 110, client devices 190A and 190B, and a network 195. The network-based application 110 is provided by application server 120 in communication with a database server 130, a machine learning server 140, a development server 150, and a search server 160. The application server 120 accesses application data (e.g., application data stored by the database server 130) to provide one or more applications to the client devices 190A and 190B via a web interface 170 or an application interface 180.

The application server 120, the database server 130, the machine learning server 140, the development server 150, the search server 160, and the client devices 190A and 190B may each be implemented in a computer system, in whole or in part, as described below with respect to FIG. 15. The client devices 190A and 190B may be referred to collectively as client devices 190 or generically as a client device 190.

Software developers use the development server 150 to create source code and documentation. The source code is deployed to the application server 120 to provide the one or more applications to the client devices 190A and 190B. The source code and documentation for different applications may be developed using different development servers, deployed to different application servers, stored using different database servers, or any suitable combination thereof. The source code for different applications may be written in different programming languages.

The machine learning server 140 accesses training data from the database server 130. Using the training data, the machine learning server 140 trains a machine learning model that is used by the search server 160 to generate embedding vectors for source code (e.g., a vector for each function definition in multiple repositories storing source code in multiple programming languages). The Python library MUSE: Multilingual Unsupervised and Supervised Embeddings may be used to generate the embeddings, to create an alignment between the monolingual embeddings using bilingual dictionaries, or both. In some example embodiments, different monolingual embeddings are used for different programming languages (e.g., one embedding for Python source code and a different embedding for Java source code). In other example embodiments, source code is translated to a common language (e.g., Python) before the embedding for the source code is generated.

As used herein, "embedding" refers to the conversion of human-readable words (in a natural language or a programming language) into multidimensional vectors suitable for computer processing. The vectors may be of one hundred dimensions or more, and thus are not suitable for manual calculation. Training of the language embeddings may be supervised or unsupervised. Supervised training takes labeled data as input. Unsupervised training learns from unlabeled data.

Multiple machine learning models may be trained by the machine learning server 140 to perform different functions. For example, a machine learning model may be trained to receive an ACD image for a function as input and generate a complexity rating of the function documented by the ACD image. As another example, a machine learning model may be trained to receive text documentation for a function as input and generate a Gunning fog index of the documentation as output. As still another example, a machine learning model may be trained to receive source code in a first programming language as input and generate source code in a second programming language as output.

The search server 160 provides search functionality to the client devices 190 to search for source code. Search criteria provided via the web interface 170 or the app interface 180 are converted to a vector. Based on the vectors generated for the source code and the vector generated for the search criteria, one or more software projects are identified that are responsive to the search criteria. In response to the received search criteria, a user interface is presented on the client device 190 that identifies one or more of the responsive software projects.

The development server 150, either automatically or in response to an instruction received from a user, analyzes the source code to identify code components and to determine a weight for each component. The development server 150 also analyzes the documentation for the source code to determine scores based on the quantity and relevance of documentation for each component in each of multiple natural languages. The quantity of documentation may be measured as a number of words or an estimate of reading time. Based on the weight for the components and the corresponding scores, a user interface is presented that informs the user of the completeness of the documentation and allows the user to update the documentation.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 15. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine learning server 140, the development server 150, the search server 160, and the client devices 190A-190B are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
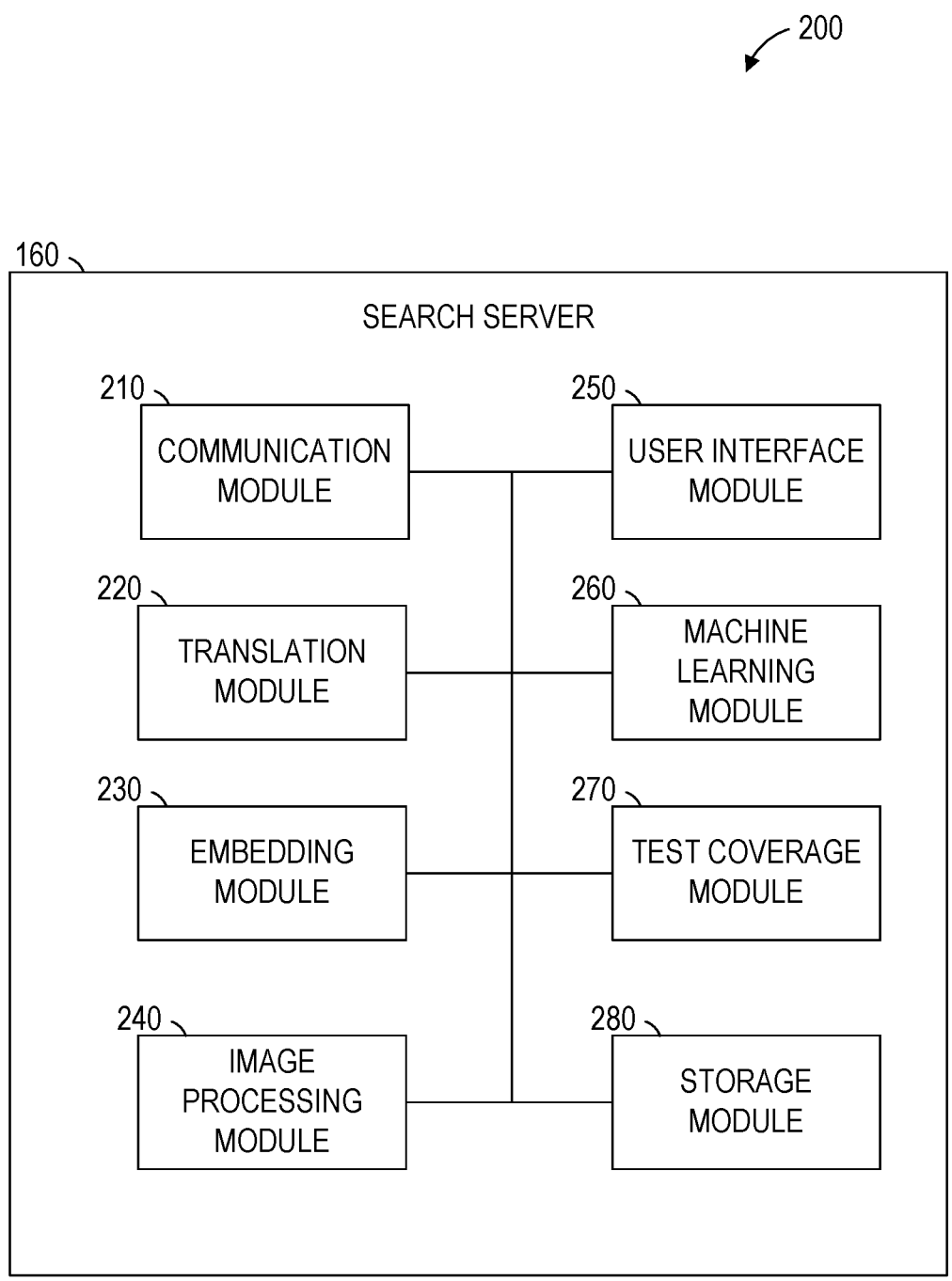
FIG. 2 is a block diagram of an example search server, suitable for searching source code and generating consolidation recommendations.

FIG. 2 is a block diagram 200 of an example search server 160, suitable for searching source code and generating consolidation recommendations. The search server 160 is shown as including a communication module 210, a translation module 220, an embedding module 230, an image processing module 240, a user interface module 250, a machine learning module 260, a test coverage module 270, and a storage module 280, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the search server 160 and transmits data from the search server 160. For example, the communication module 210 may receive, from the client device 190A or 190B, search criteria for searching for source code. The search criteria may comprise keywords, a selection of programming languages, a selection of source code repositories, a selection of minimum or maximum documentation completeness, a selection of minimum or maximum test coverage, or any suitable combination thereof. The source code and documentation to be searched by the search server 160 may be stored on the development server 150 (e.g., on a hard drive) or in remote storage (e.g., a network storage device). Communications sent and received by the communication module 210 may be intermediated by the network 195.

The translation module 220 translates source code from one programming language to another. For example, one programming language (e.g., Python) may be selected as the primary programming language. Source code written in other programming languages (e.g., Java or C) is translated by the translation module 220 into the primary programming language. The translation may be performed by a trained machine learning model (e.g., a machine learning model trained by the machine learning module 260).

The search server 160 generates language embedding vectors for the source code using the embedding module 230. The embedding module 230 may receive, as input, source code for a function written in the primary programming language and generate, as output, a high-dimensional vector representing the function. The embedding may be performed using a trained machine learning model.

The image processing module 240 generates data for source code based on corresponding images. For example, an image of an ACD for a function may be received as input and a numerical complexity rating for the function may be generated as output. The image processing may be performed using a trained machine learning model.

A user interface for searching is provided by the search server 160 using the user interface module 250. For example, a hypertext markup language (HTML) document may be generated by the user interface module 250, transmitted to a client device 190 by the communication module 210, and rendered on a display device of the client device 190 by a web browser executing on the client device 190. The user interface may comprise text fields, drop-down menus, and other inputs fields. The user interface may also comprise results and recommendations.

The machine learning module 260 trains machine learning models to perform various functions based on training data. For example, a machine learning model may be trained using input source code pairs, with one element of each pair being written in a first programming language and the other element of each pair being written in a second programming language. This machine learning model is trained to generate source code in the second programming language based on source code in the first programming language. Multiple machine learning models may be trained to translate from multiple input source code languages to a common output source code language, allowing later operations to be performed without needing to deal with multiple programming languages.

As another example, a machine learning model may be trained using ACD images annotated with complexity measures. This machine learning model is trained to generate a complexity measure based on an ACD image. Another machine learning model may be trained using source code documentation annotated with its Gunning fog index. This machine learning model is trained to generate a Gunning fog index based on source code documentation. Still another machine learning model may be trained using source code, corresponding test code, and annotation indicating the completeness of test coverage. This machine learning model is trained to determine the completeness of test coverage based on source code and corresponding test code.

The test coverage module 270 determines a measure of test coverage for source code. For example, the percentage of lines of source code for a function that are exercised by test code may be the measure of test coverage for the function. The completeness of the test coverage may be measured using a trained machine learning model.

Trained machine learning models, search queries, search results, or any suitable combination thereof may be stored and accessed by the storage module 280. For example, local storage of the search server 160, such as a hard drive, may be used. As another example, network storage may be accessed by the storage module 280 via the network 195.

Figure 3:
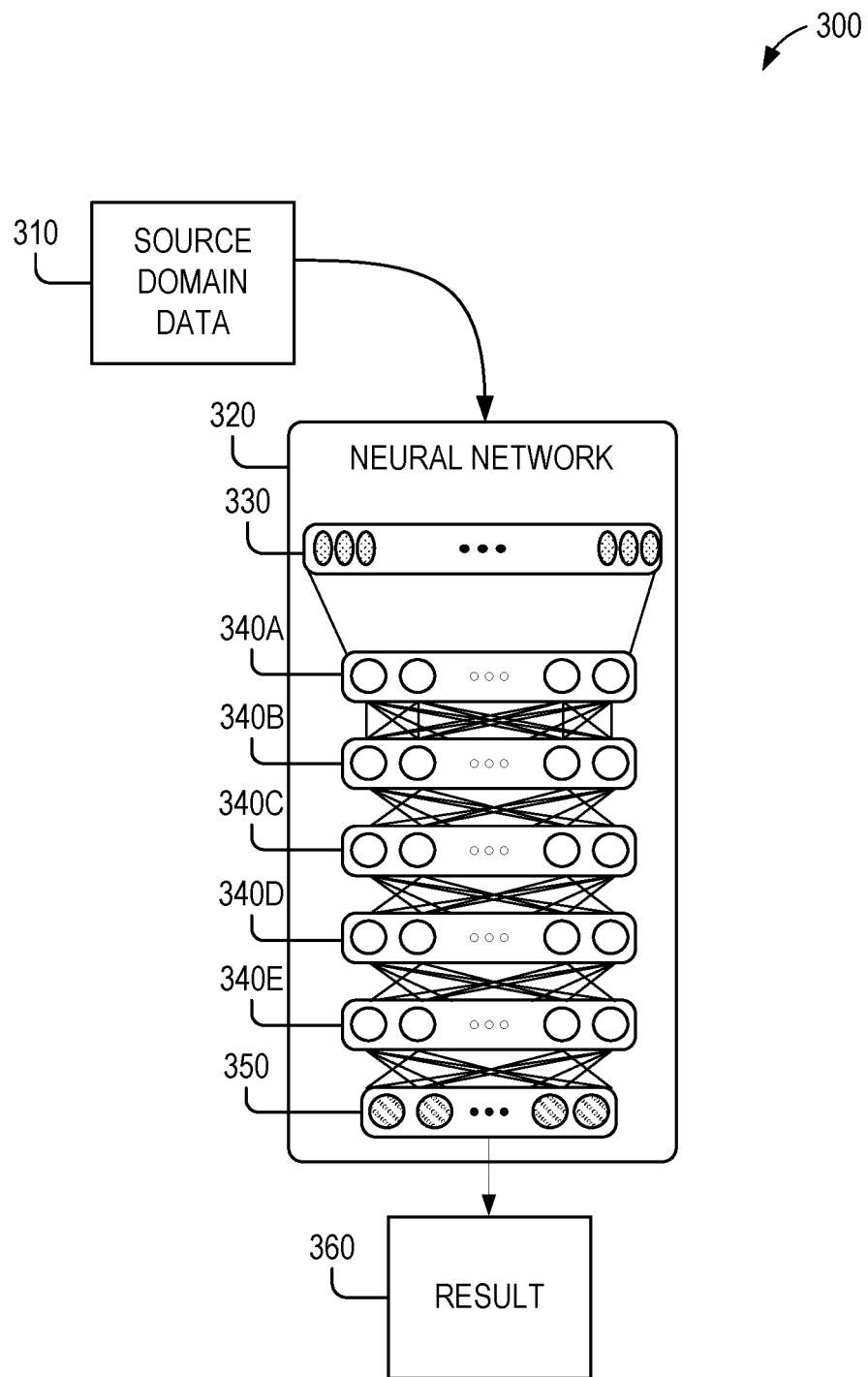
FIG. 3 is a block diagram of an example neural network, suitable for use in categorizing source code, searching for source code, or generating consolidation recommendations.

FIG. 3 illustrates the structure of an example neural network 320. The neural network 320 takes source domain data 310 as input, processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs, and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-and-white images. Each color image may be used as a "label" for the corresponding black-and-white image, and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
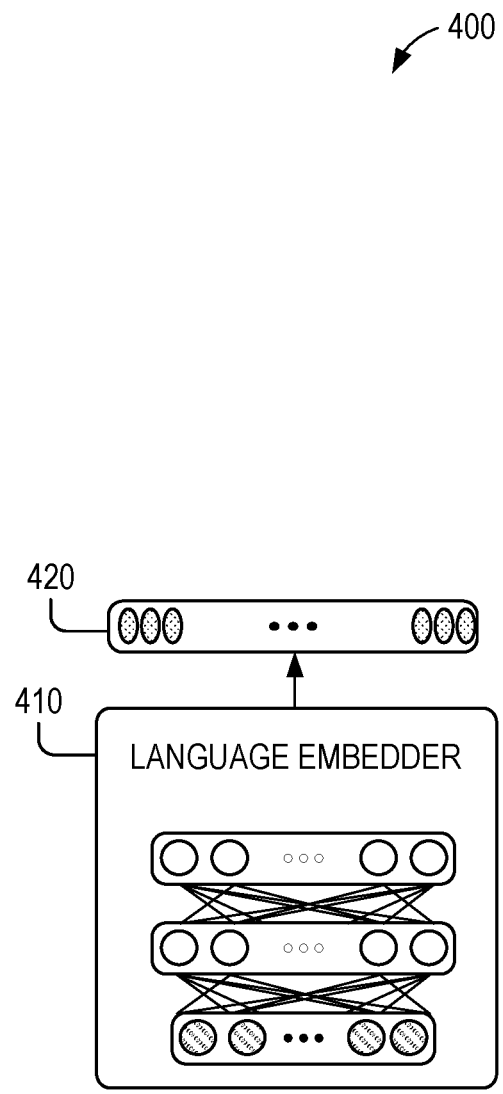
FIG. 4 is a block diagram of an example neural network, suitable for generating language embeddings for programming languages or natural languages.

FIG. 4 is a block diagram of an example model architecture 400 for language embedding. The model architecture 400 includes a language embedder 410 and a resulting vector 420. The language embedder 410 is trained so that the distance (or loss) function for two related text strings is reduced or minimized. For example, synonymous natural language text or programming language text may be provided as inputs and the language embedder 410 trained to minimize the distance between the resulting vectors.

The specific architecture of the language embedder 410 may be chosen dependent on the type of input data for an embedding layer that is followed by some encoder architecture that creates a vector from the sequence. Embeddings and encoder parameters are shared between the text fields. In the simplest case the encoder stage is just an elementwise average of the token embeddings.

Alternatively, the encoding may include converting pairs of words of the text to bigram vectors and combining the bigram vectors to generate a vector for the text. For example, the text "function performs" may have a corresponding vector as a bigram, rather than two separate vectors for "function" and "performs" that are combined. The text "This function processes incoming emails to detect junk" may be stripped of articles and prepositions and converted to vectors for each of the bigrams "This function," "function processes," "processes incoming," "incoming emails," "emails detect," and "detect junk." The vector for a text string may be determined as an average of the bigram vectors for the bigrams in the text string.

In some example embodiments, a pre-trained vector embedding is used rather than training an embedding on a training set. For example, the doc2vec embedding may be used.

FIGS. 5-6 are block diagrams of an example database schema 500, suitable for use in source code discovery and generating consolidation recommendations. The database schema 500 includes, in FIG. 5, a Python mapping table 510, an English mapping table 540, and a test coverage table 570. The Python mapping table 510 includes rows 530A, 530B, and 530C of a format 520. The English mapping table 540 includes rows 560A, 560B, and 560C of a format 550. The test coverage table 570 includes rows 590A, 590B, and 590C of a format 580.

The Python mapping table 510 contains the embedding vectors for input Python words. Using the Python mapping table 510, the embedding module 230 is enabled to generate vector embeddings for input Python source code. For example, a vector may be generated for the source code for a function by summing or averaging the vectors of the words in the function. The contents of the Python mapping table 510 may be generated by the trained language embedder 410 of FIG. 4. Once fully trained, the embeddings for a dictionary of Python terms may be generated and stored in a database table for more efficient access. The embeddings may be accessed from the database table to generate vector representations of documentation in source code. Alternatively, the trained language embedder may be used to generate embeddings dynamically, without the use of the Python mapping table 510. The trained language embedder may be able to generate accurate embeddings for variations of words or phrases not found in the dictionary.

Each row of the English mapping table 540 contains the embedding vector for an input English word. The contents of the English mapping table 540 may be generated by the trained language embedder 410 of FIG. 4. Once fully trained, the embeddings for a dictionary of English terms may be generated and stored in a database table for more efficient access. The embeddings may be accessed from the database table to generate vector representations of documentation in source code. Alternatively, the trained language embedder 410 may be used to generate embeddings dynamically, without the use of the English mapping table 540. The trained language embedder 410 may be able to generate accurate embeddings for variations of words or phrases not found in the dictionary.

Each row 590A-590C of the test coverage table 570 identifies a coverage score for an identified project. Different methods of determining the coverage score may be used. In the example of the test coverage table 570, the score is equal to the fraction of lines of code in the project that are exercised by a test application for the project. Thus, row 590A shows that 90% of the lines of code in the project with identifier 1 are executed by the test application for the project.

The database schema 500 includes, in FIG. 6, a function table 610, a complexity table 640, and a search table 670. The function table 610 includes rows 630A, 630B, and 630C of a format 620. The complexity table 640 includes rows 660A, 660B, and 660C of a format 650. The search table 670 uses a format 680 for rows 690A, 690B, and 690C.

The function table 610 includes one row for each function in all projects available for searching. The row for a function includes a unique identifier for the function, the identifier for the project in which the function resides, a unique identifier for an image containing an ACD for the function, and a category for the function. The identifier for the project may be cross-referenced with the project identifier field in the test coverage table 570. Any one or more of the project identifier, the function identifier, and the image identifier may be a character string containing a path in a file system. For example, the repository identifier may be "/projects/Java-Repository," the function identifier may be "generic.class/myfunction," and the image identifier may be "/images/myfunction-ACD.png." When numeric identifiers are used, as in FIG. 6, the identifiers may be used as cross-references to other tables that store the paths. The category for each function may be generated by a trained machine learning model that takes a vector representation of the function or the repository as input and generates a category identifier as output. Alternatively, a user (e.g., a programmer of the function) may select the category identifier for the function or the project from a pre-defined list of available categories.

Figure 8:
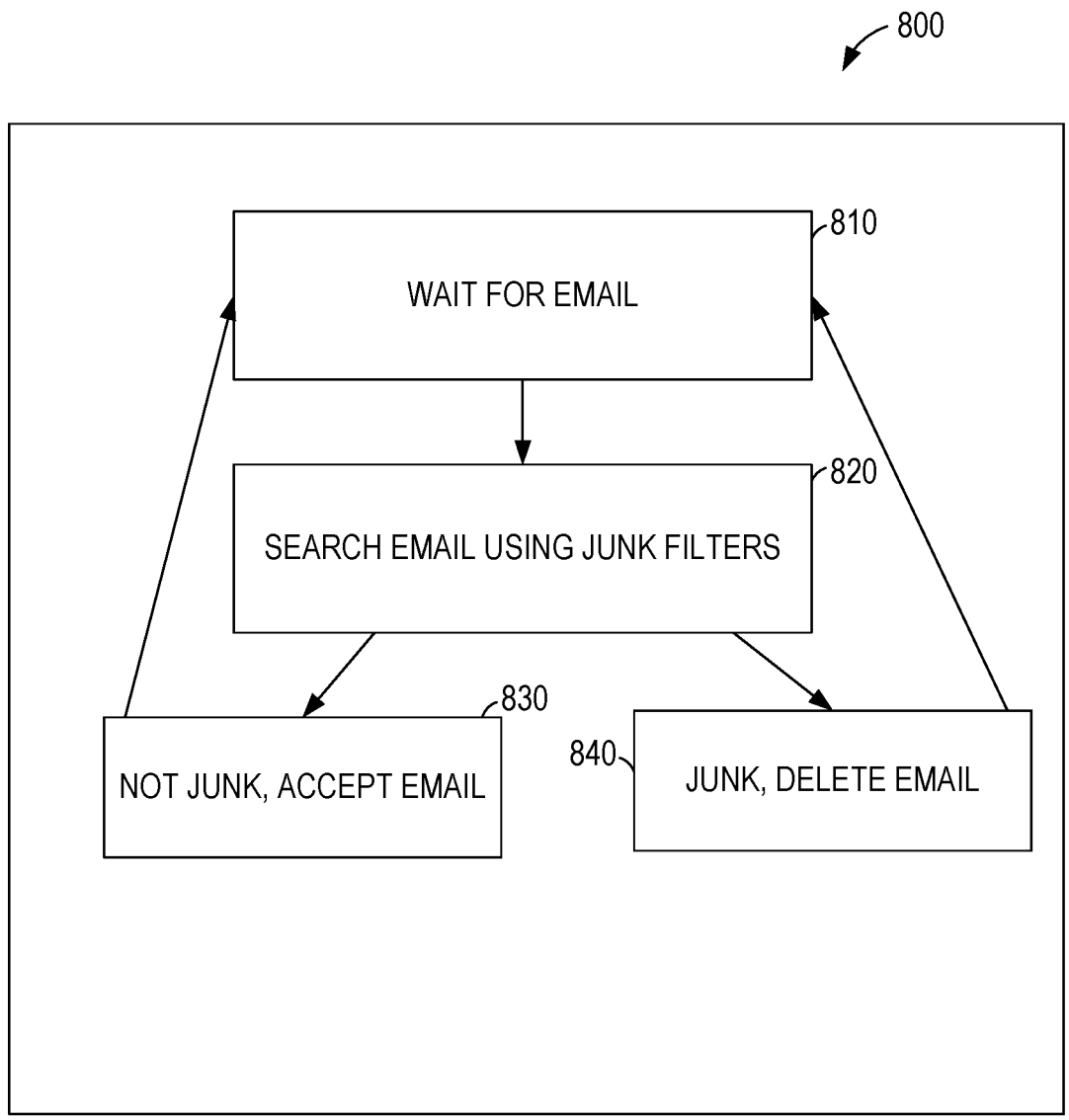
FIG. 8 is an example image of an activity cycle diagram (ACD), suitable for analysis by a machine learning model to determine source code complexity.

Each of the rows 660A-660C of the complexity table 640 identifies the complexity and the identifier of an image of an ACD. The identifier of the image in the complexity table 640 may be cross-referenced with the image identifier in the function table 610. Alternatively, the complexity for the ACD of a function may be stored directly in the function table 610 in addition to or instead of the image identifier. In the example of FIG. 6, the complexity is the number of nodes depicted in the image of the ACD. An example image of an ACD is shown in FIG. 8, discussed in more detail below.

The search table 670 stores a function identifier and a category, complexity, and vector for the identified function. The search table 670 may be used by the search server 160 to identify functions matching search criteria provided by a user. For example, the user may select a category from a list of available categories, enter a text string describing a category, or any suitable combination thereof. The user may also enter text describing the desired functionality. The entered text is converted to a vector representation and one or more functions are identified based on a similarity between the vectors for the functions and the vector representation for the user's text.

For example, cosine similarity may be used and functions may be identified based on the cosine similarity of the vector for the function with the user's text vector exceeding 0.6. The identified functions may be sorted for presentation to the user based on the similarity measures, the complexities, whether the category of the function matches a user-selected category, or any suitable combination thereof. For two identical vectors, the cosine is one; for two orthogonal vectors, the cosine is zero; for two vectors pointing in opposite directions, the cosine is negative one; other relationships between the two vectors will yield other values for the cosine between one and negative one. Thus, if the similarity score is close to unity, the semantic meaning of the user's query is similar to the semantic meaning of the source code itself.

For the purposes of example, only a few rows and columns are shown in each table of the database schema 500. Additional columns in one or more of the tables may serve to identify one or more of the project, source code file, author, owner, creation date, or modification date associated with the source code elements, the documentation, search queries, or any suitable combination thereof. Additional tables may also be used, such as additional mapping and coverage tables for additional natural or programming languages. Alternatively, one or more tables of the database schema 500 may be combined.

Figure 7:
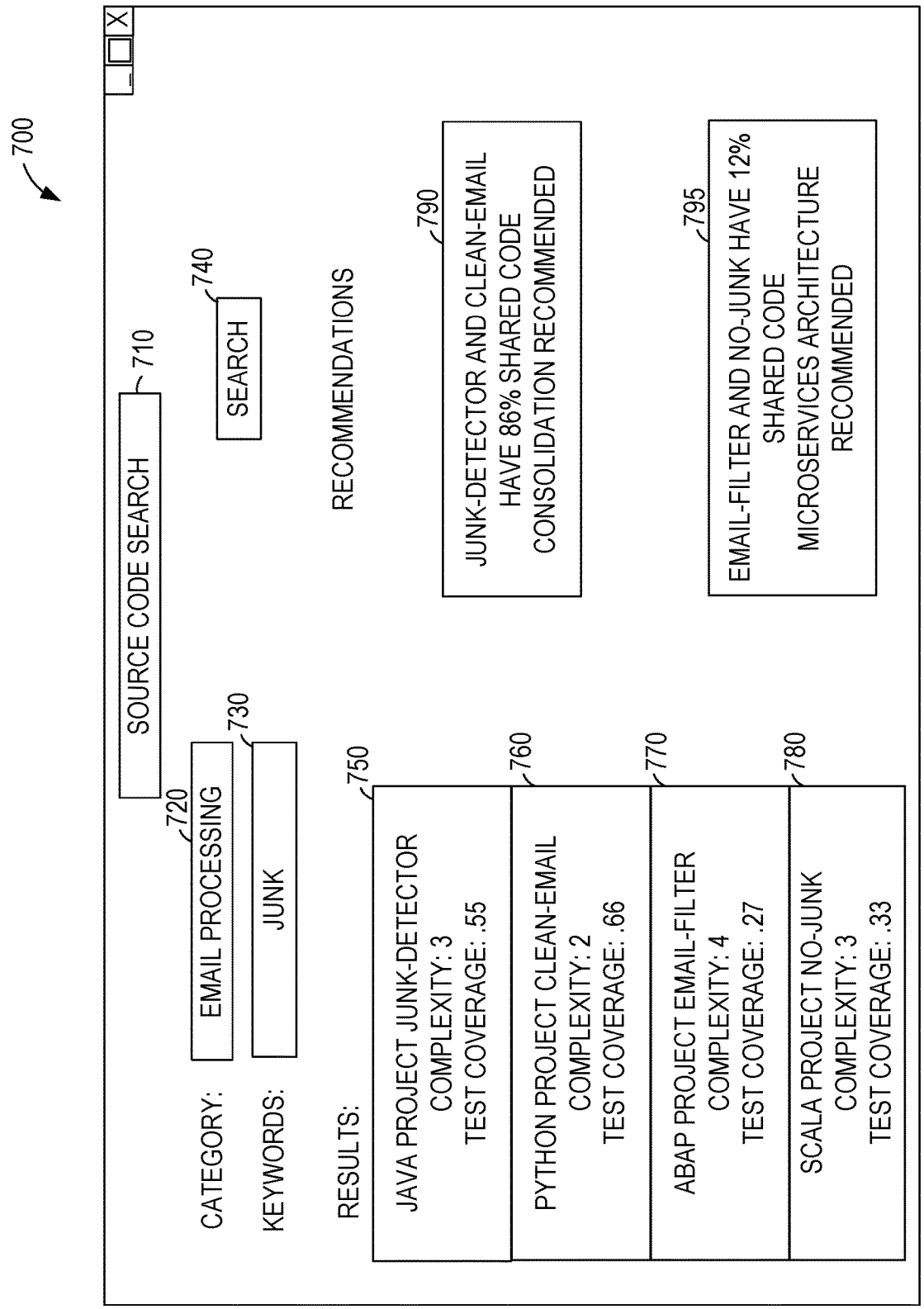
FIG. 7 is a block diagram of an example user interface for searching for source code, presenting search results, and presenting consolidation recommendations.

FIG. 7 is a block diagram of an example user interface 700 for searching for source code, presenting search results, and presenting consolidation recommendations. The user interface 700 includes a title 710; input fields 720 and 730; button 740, search results 750, 760, 770, and 780; and recommendations 790 and 795. The user interface 700 may be displayed on a display device of the client device 190A or 190B in response to a request from a user of the client device 190A or 190B. For example, a user may press a button on a user interface that causes the user interface 700 to be presented (e.g., by causing the search server 160 to generate an HTML document and provide it to the client device 190A for rendering the user interface 700 on a display device of the client device 190A).

The title 710 indicates that the user interface 700 is for a source code search. The user interacts with the input fields 720 and 730 to provide the criteria for the search. For example, the input field 720 may be implemented as a drop-down selector that allows the user to select a category from a set of predefined categories. The input field 730 may be implemented as a text field that allows the user to enter one or more keywords. Alternatively, the input field 730 may allow the user to select one or more keywords from a set of predefined keywords. After providing the search criteria, the user may press the button 740 to submit the search criteria to the search server 160 via the network 190.

In response to receiving the search criteria, the search server 160 accesses data from the database server 130 (e.g., data stored according to the schema 500) and identifies zero or more search results. The search server 160 selects zero or more of the identified search results and provides them to the client device 190A for display in the user interface 700. In the example of FIG. 7, four search results 750-780 are provided and displayed. Information about the search results is displayed. In the example of FIG. 7, the displayed information includes the language of the identified source code project, the name of the project, the complexity of the identified source code, and a test coverage measure of the identified source code. More or fewer pieces of information may be displayed. For example, a creation date, a last modified date, a creator name, a measure of quantity (e.g., lines of code, total number of functions, number of source code files, or the like), or any suitable combination thereof may be included.

The search results 750-780 may be operable to cause the source code corresponding to the search result to be accessed. For example, a source code editor may be displayed, loaded with the source code corresponding to the search result.

In addition to or instead of the search results 750-780, one or more recommendations (e.g., the recommendations 790 and 795) may be displayed. The recommendation 790 indicates that two projects have a substantial amount of shared code and that consolidation is recommended. The amount of shared code may be determined by a measure of the similarity of the vectors for the functions in each project. For example, two functions (one in each project) with a cosine similarity that exceeds a threshold may be considered to be shared. Thus, the indication of "86% shared code" in the recommendation 790 may indicate that 86% of the functions in one project are shared by the other project. Accordingly, if the remaining 14% of the functions are added to the other project, the full functionality of both projects will be realized in a single project. Consolidation reduces the overhead of maintenance, documentation, and training. A consolidation recommendation may be based on the percentage of shared code exceeding a threshold (e.g., 50%, 60%, or 80%).

When comparing two projects for the percentage of shared code, the result may differ depending on the order in which the projects are considered. For example, a large project may have only 50% of its code implemented by a similar, but smaller, project, while the smaller project has 90% of its code implemented by the larger project. The percentage displayed in the recommendation 790 may be the larger of the two calculated percentages. The recommendation 790 may also include an indication of which project should be kept after consolidation and which should be deprecated or deleted. Thus, if the Java project Junk-Detector implements 86% of the Python project Clean-Email but Clean-Email only implements 40% of Junk-Detector, the recommendation 790 may indicate that consolidation of the remaining Clean-Email functionality into the Junk-Detector project is recommended.

The recommendation 795 indicates that two projects have a low percentage of shared code and a microservices architecture is recommended. The determination that the percentage of shared code is "low" may be based on a comparison of the percentage of shared code with a threshold. This threshold may be the same as the threshold for recommending consolidation, such that for any pair of projects either a microservices architecture or consolidation is recommended. Alternatively, the threshold for recommending a microservices architecture may be lower than the threshold for recommending consolidation (e.g., 20%, 40%, or 50%) so that, for some pairs of projects, no recommendation is generated.

The strength of the recommendation may depend on the percentage of shared code. In the user interface 700, four search results are presented. Using these four search results, six pairs of projects may be identified, but only two recommendations are presented. The single strongest consolidation recommendation (e.g., the highest percentage of shared source code) and the single strongest microservices recommendation (e.g., the lowest percentage of shared source code) may be presented. Alternatively, the two strongest recommendations (e.g., with the greatest difference between the shared source code and the corresponding threshold) may be presented.

Additional or fewer information may be presented in the user interface 700. For example, the search results may indicate the number of lines of code in each project, the number of contributors to each project, the number of commits to each project, or any suitable combination thereof.

By use of the user interface 700, a user is enabled to search multiple repositories to identify already-existing source code that matches the user's search criteria. By accessing existing source code, the user is saved the effort of creating new source code to address a particular problem. Additionally, the search server provides recommendations that allow the user to efficiently determine whether functionality of multiple projects should be accessed by consolidating the functionality of the projects of by using the multiple projects in a microservices architecture.

FIG. 8 is an example image 800 of an architecture concept document (ACD), suitable for analysis by a machine learning model to determine source code complexity. The image 800 depicts four states 810, 820, 830, and 840 of a function, along with arrows indicating the possible sequence of states.

In state 810, the function waits for an email. When an email is received, the function searches the email using junk filters, in state 820. If the email is not junk (e.g., does not match the junk filters), the email is accepted in state 830 and the function returns to state 810. If the email is junk (e.g., matches the junk filter), the email is deleted in state 840 and the function returns to state 810.

A trained machine learning model may process the image 800 as input and generate a complexity value as output. The complexity value may be the number of states depicted in the image 800 (in this example, four). The complexity value for each function may be stored in the search table 670. Complexity for a project may be determined as a function of the complexity of the functions within the project. For example, the project complexity may be the sum of the complexity of the functions, the average of the complexity of the functions, the maximum of the complexity of the functions, the minimum of the complexity of the functions, or any suitable combination thereof. Complexity for projects, functions, or both may be used by the search server 160 to prioritize search results (e.g., by prioritizing results with greater complexity over results with lower complexity).

Figure 9:
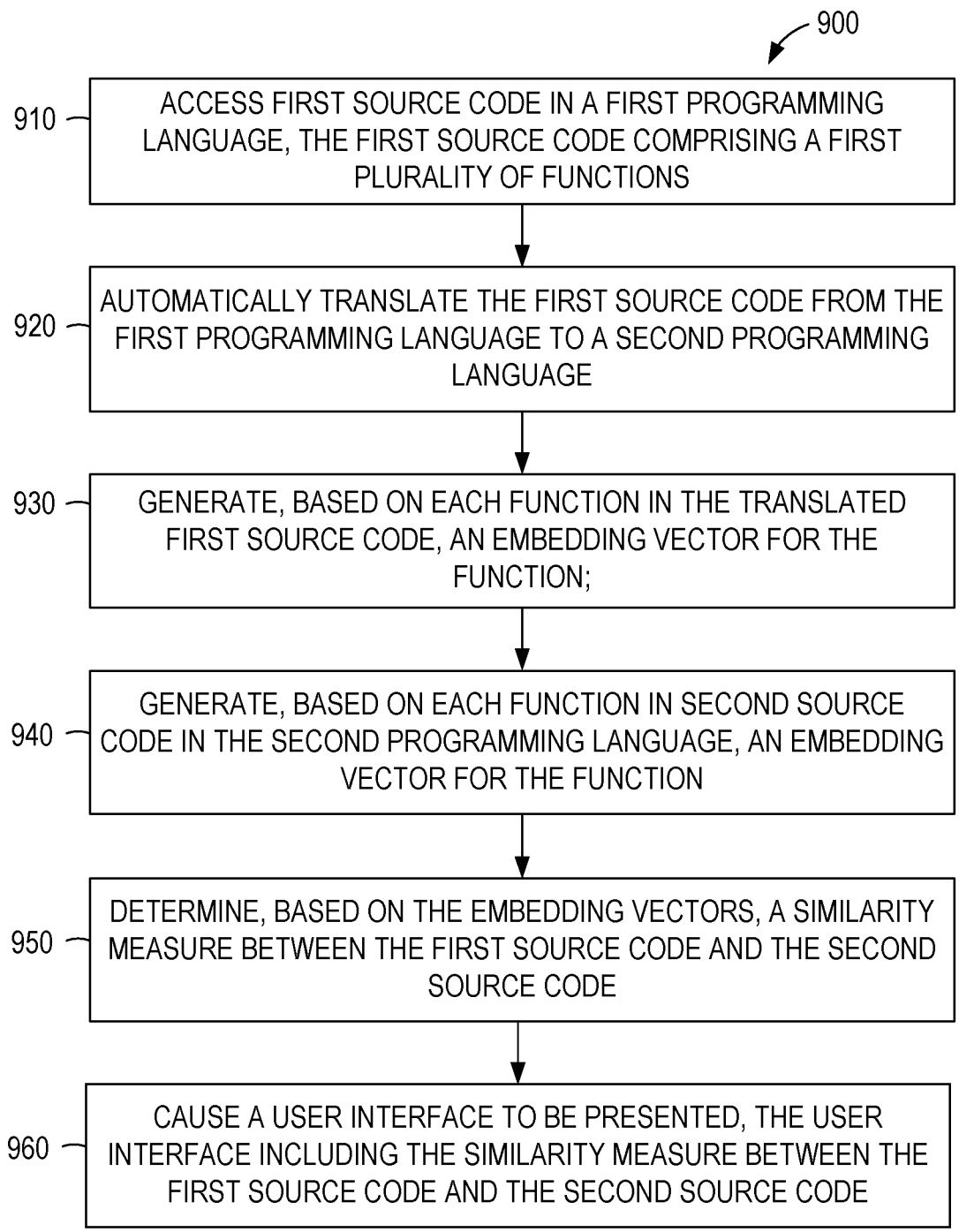
FIG. 9 is a flowchart illustrating operations of an example method suitable for generating vectors to represent functions written in different programming languages and identifying similar functions.

FIG. 9 is a flowchart illustrating operations of an example method 900 suitable for generating vectors to represent functions written in different programming languages and identifying similar functions. The method 900 includes operations 910, 920, 930, 940, 950, and 960. By way of example and not limitation, the method 900 may be performed by the search server 160 of FIG. 1, using the modules, databases, images, and user interfaces shown in FIGS. 2-8.

In operation 910, the translation module 220 of the search server 160 accesses first source code in a first programming language, the first source code comprising a first plurality of functions. For example, the Java project Junk-Detector referenced in the search result 750 of FIG. 7 may be accessed.

The translation module 220, in operation 920, automatically translates the first source code from the first programming language (e.g., Java) to a second programming language (e.g., Python). For example, a machine learning model trained on pairs of equivalent function, with one function of each pair written in the first programming language and the other function of each pair written in the second programming language, may be suitable for performing the translation.

In operation 930, the embedding module 230 generates, based on each function in the translated first source code, an embedding vector for the function. For example, a language embedder trained on annotated functions written in the second programming language may be suited to generate the embedding vectors for the translated functions.

The embedding module 230, in operation 940, generates, based on each function in second source code in the second programming language, an embedding vector for the function. For example, the language embedder may generate embedding vectors based on the functions of the Python project Clean-Email referenced in the search result 760 of FIG. 6. The same language embedder is used in operations 930 and 940.

In operation 950, the machine learning module 260 determines, based on the embedding vectors, a similarity measure between the first source code and the second source code. For example, a machine learning model may be trained on pairs of annotated embedding vectors, with the annotation indicating whether the functions corresponding to the embedding vectors are similar or dissimilar. Such a machine learning model generates, for future pairs of embedding vectors, an output indicating whether the corresponding functions are similar or dissimilar. Alternatively, a cosine distance between the two vectors may be generated and compared with a predetermined threshold. If the cosine distance meets or exceeds the threshold, the functions are considered to be similar. Otherwise, the functions are not similar. For each function in the first source code, each function in the second source code, or both, the embedding vector for the function is compared to the embedding vectors or all functions in the other source code to determine if a similar function exists. The percentage of functions for which a similar function exists in the other source code is a similarity measure between the first source code and the second source code. This similarity measure is a measure of the similarity of the code.

A second similarity measure between the first source code and the second source code may be determined based on the documentation of the first source code and the second source code. For example, each software project may have corresponding documentation (e.g., accessed via a web page for the software project). The documentation may be processed by a natural language embedder to generate a vector. The documentation vectors for two projects may be compared to generate a similarity of the documentation or a similarity of the concepts addressed by the two projects.

The user interface module 250, in operation 960, causes a user interface to be presented, the user interface including the similarity measure between the first source code and the second source code. For example, the user interface 700 may be presented, including the recommendations 790 and 795, each of which indicates a similarity measure between two source code projects in the form of a percentage of shared code. A second similarity measure, regarding the similarity of the concepts as determined from the documentation, may also be presented. Alternatively, multiple similarity measures may be combined (e.g., averaged) to yield a composite similarity measure that is displayed.

Figure 10:
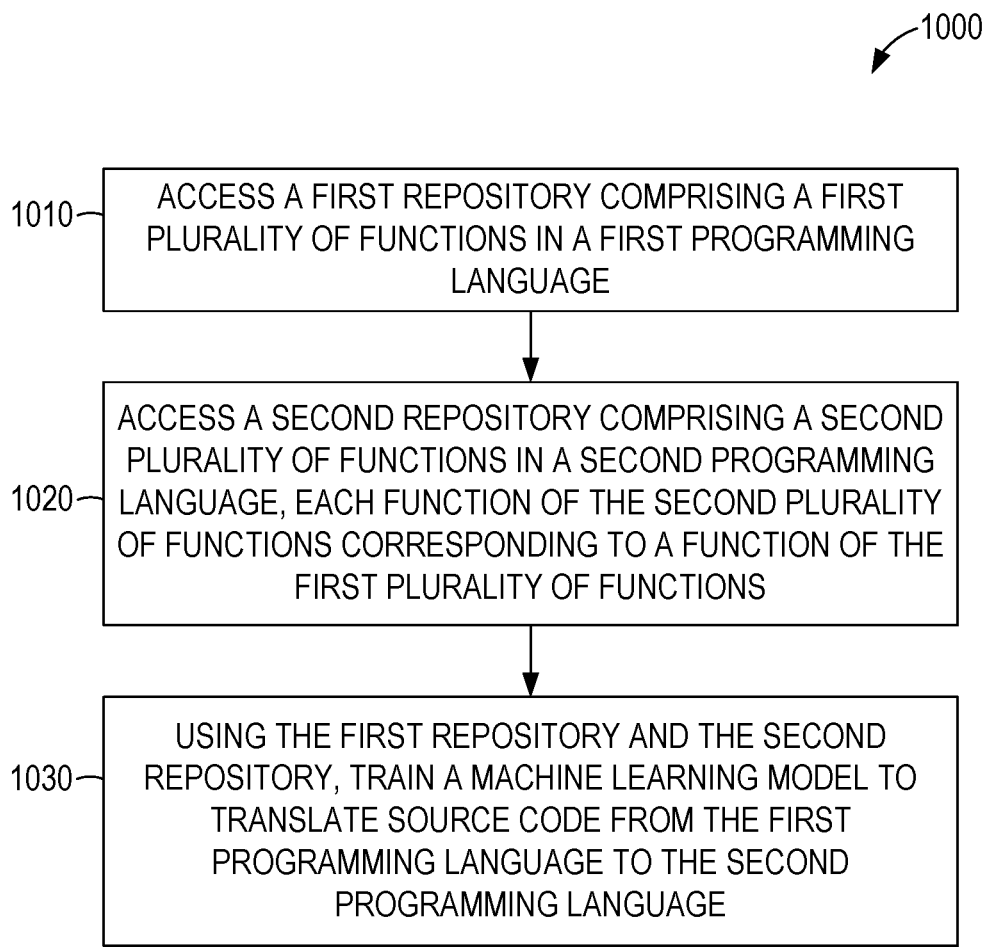
FIG. 10 is a flowchart illustrating operations of an example method suitable for training a machine learning model to translate source code from one programming language to another programming language.

FIG. 10 is a flowchart illustrating operations of an example method 1000 suitable for training a machine learning model to translate source code from one programming language to another programming language. The method 1000 includes operations 1010, 1020, and 1030. By way of example and not limitation, the method 1000 may be performed by the machine learning server 140 or the machine learning module 260 of the search server 160, using the modules, databases, and structures shown in FIGS. 2-7. The machine learning model generated using the method 1000 may be used in operation 920 of the method 900.

In operation 1010, the machine learning server 140 accesses a first repository comprising a first plurality of functions in a first programming language. For example, a repository containing functions written in Java may be accessed from an open-source server.

The machine learning server 140, in operation 1020, accesses a second repository comprising a second plurality of functions in a second programming language. For example, a repository containing functions written in Python may be accessed from the open-source server or a different server. The two repositories may be hosted by the same server and identify corresponding functions in the two repositories. For example, a function in each repository may perform prime decomposition for an input integer, another function in each repository may perform complex multiplication, and a third function in each repository may retrieve web pages using HTTP.

In operation 1030, the machine learning server 140, using the first repository and the second repository, trains a machine learning model to translate source code from the first programming language to the second programming language. Function pairs of the two repositories serve as a training set, with a function in the first programming language being the training input and the corresponding function in the second programming language being the expected value generated from the training input. By repeating the training process over a number of iterations and for a number of training pairs, the machine learning model is trained to generate output in the second programming language in response to input in the first programming language.

The translation may be a multi-step process including a first machine learning model that translates input text from the first programming language into a high-dimensional vector representation and a second machine learning model that translates the high-dimensional vector representation to the second programming language. In this case, the two machine learning models may be trained together, using a back propagation algorithm to propagate feedback through the two machine learning models.

The method 1000 may be repeated for multiple "first" programming languages (e.g., Java, C, and Perl) and the same "second" programming language (e.g., Python). In this way, trained machine learning models suitable for translating source code from any of the "first" programming languages to the common "second" programming language are created. As a result, downstream applications may be designed that operate only on the common programming language, simplifying them.

Figure 11:
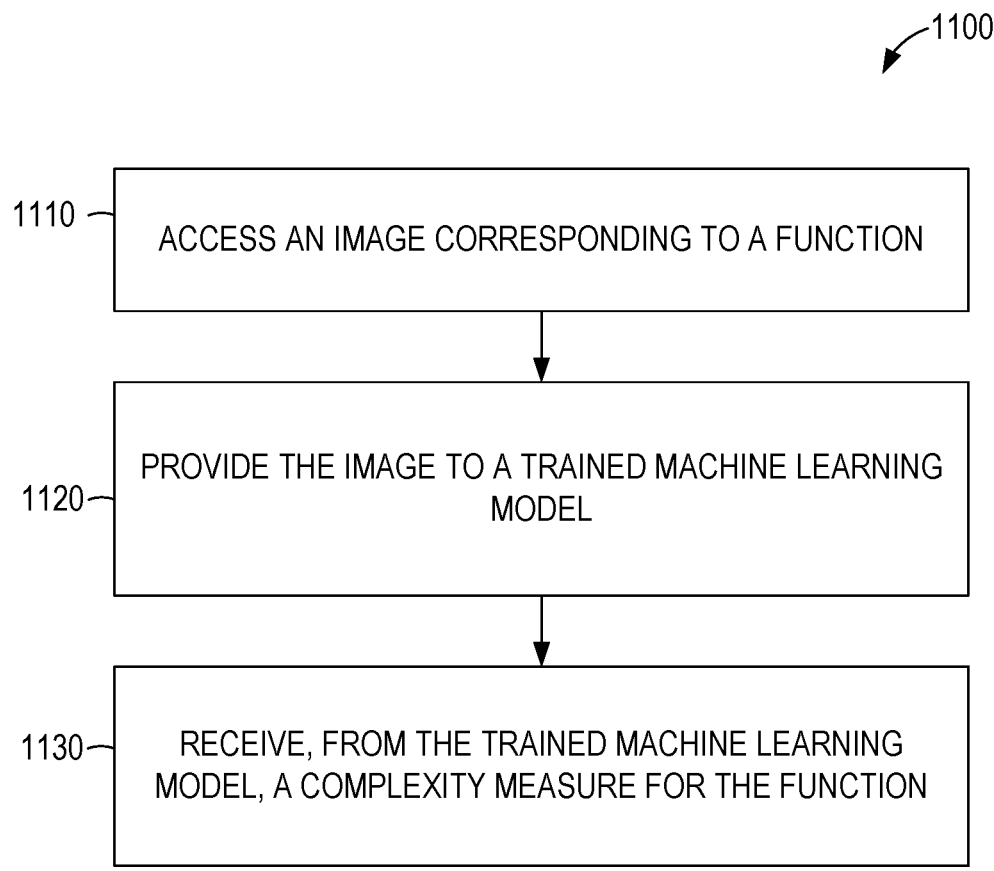
FIG. 11 is a flowchart illustrating operations of an example method suitable for using an image corresponding to a function to generate a complexity measure for the function.

FIG. 11 is a flowchart illustrating operations of an example method 1100 suitable for using an image corresponding to a function to generate a complexity measure for the function. The method 1100 includes operations 1110, 1120, and 1130. By way of example and not limitation, the method 1100 may be performed by the search server 160 of FIG. 1, using the modules, databases, and images shown in FIGS. 2-8. The method 1100 may be used by the search server 160 to determine the complexity measures for functions matching search criteria. In generating a user interface including search results (e.g., the user interface 700 of FIG. 7), search results may be prioritized in order of decreasing complexity.

In operation 1110, the search server 160 accesses an image corresponding to a function. For example, the image 800, depicting an ACD of a function, may be accessed.

The search server 160, in operation 1120, provides the image to a trained machine learning model. For example, the machine learning module 260 of the search server 160 may receive the image. Alternatively, the search server 160 may provide the image to the machine learning server 140 via the network 195.

In operation 1130, the search server 160 receives, from the trained machine learning model, a complexity measure for the function. For example, the machine learning model may count a number of states depicted in the ACD (e.g., four, for the ACD depicted in FIG. 8) and return the number of states as a complexity measure. In addition to or instead of the complexity measure being based on the number of depicted states, the complexity measure may be based on the number of transitions between states. Thus, an ACD depicting a fully-connected network of four states with twelve transitions would have a higher complexity than the ACD depicted in FIG. 8, with only five transitions.

Other methods may be used to process the image accessed in operation 1110 to determine the complexity measure. For example, the histogram of orientation gradients (HOG) method may be used to identify edges in the image, and thus to detect objects.

Figure 12:
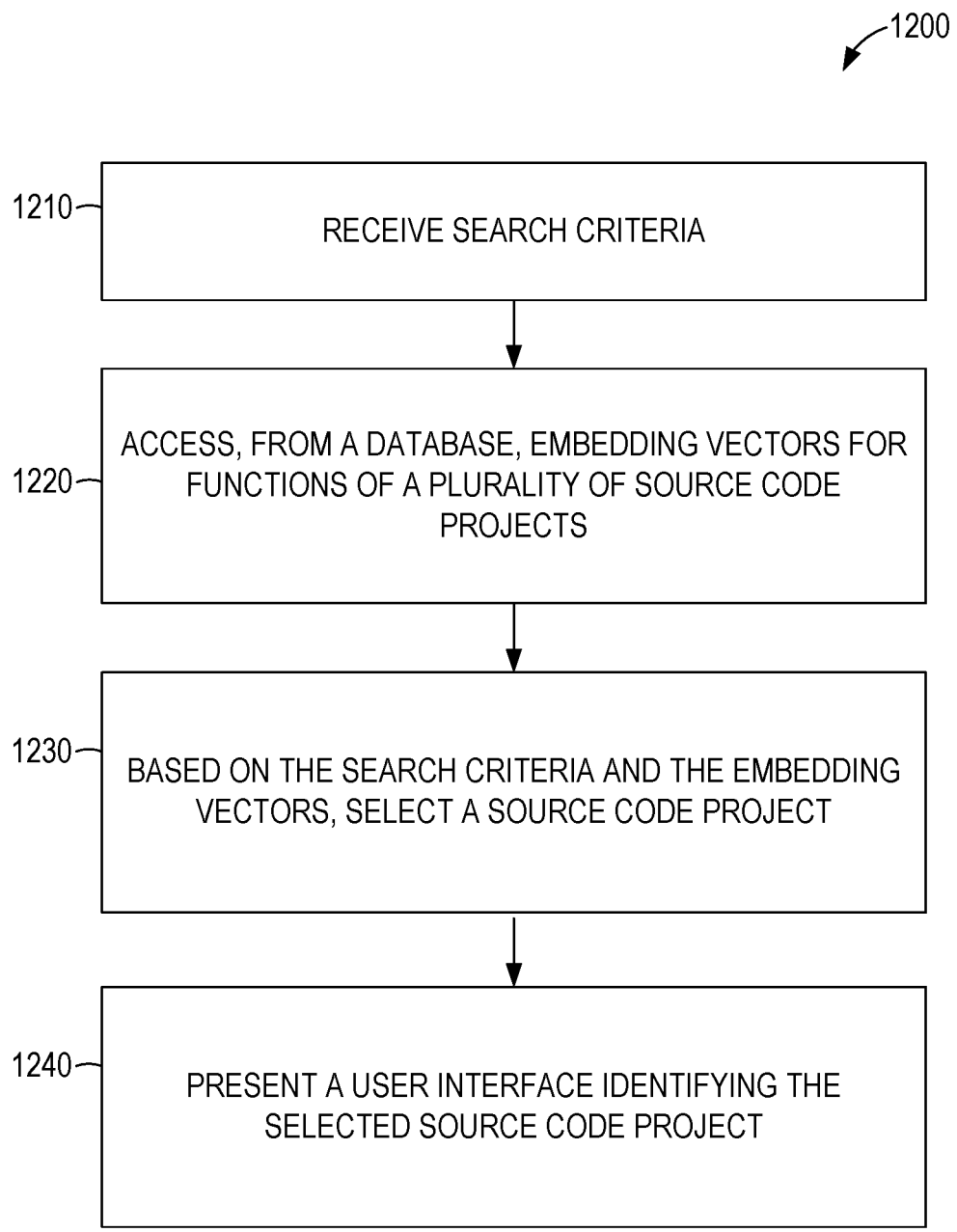
FIG. 12 is a flowchart illustrating operations of an example method suitable for searching for a software project.

FIG. 12 is a flowchart illustrating operations of an example method 1200 suitable for searching for a source code project. The method 1200 includes operations 1210, 1220, 1230, and 1240. By way of example and not limitation, the method 1200 may be performed by the search server 160, using the modules, databases, structures, images, and user interfaces shown in FIGS. 2-8. The method 1200 may be used to generate the source code search user interface 700 of FIG. 7.

In operation 1210, the user interface module 250 or the communication module 210 receives search criteria. For example, the user interface 700 may be presented and the user may provide a category, search text, or both as search criteria. As another example, a command-line interface or programmatic interface may be used to provide the search criteria to the search server 160 via the network 195.

The storage module 280, in operation 1220, accesses, from database, embedding vectors for functions of a plurality of source code projects. For example, the embedding vectors generated in operations 930 and 940 of the method 900 may be stored in the function table 610 or the search table 670 of FIG. 6 and accessed in operation 1220.

Based on the search criteria and the embedding vectors, the search server 160 selects a source code project (operation 1230). The search text received in operation 1210 (if any) may be converted to a vector and compared to the vectors accessed in operation 1220. The source code project with the most-similar vector may be selected. Alternatively, the vectors for the functions of each project may be averaged to generate a project vector. The source code project with the project vector that is most similar to the search text vector may be selected. The category received in operation 1210 (if any) may be compared to categories for the projects or the functions prior to comparing the vectors, such that only vectors for functions or projects that match the search category are compared to the vector for the search text, reducing computations performed in comparing vectors.

In operation 1240, the user interface module 250 causes a user interface to be presented that identifies the selected source code project. Multiple source code projects may be selected and identified. For example, the search results 750-780 of the user interface 700 may be presented. Thus, by use of the method 1200, a user is enabled to search for source code of multiple repositories to find functions and projects that provide searched-for functionality. In conjunction with operations 910-940 of the method 900, the repositories may include source code written in different programming languages. When embedding vectors for the functions are used to generate the search results, the search results are generated based on the source code itself rather than documentation or other separate description. As a result, the search results may reflect the actual functionality provided rather than reflect potentially outdated or erroneous supplemental information, improving the functionality of the search server 160.

Figure 13:
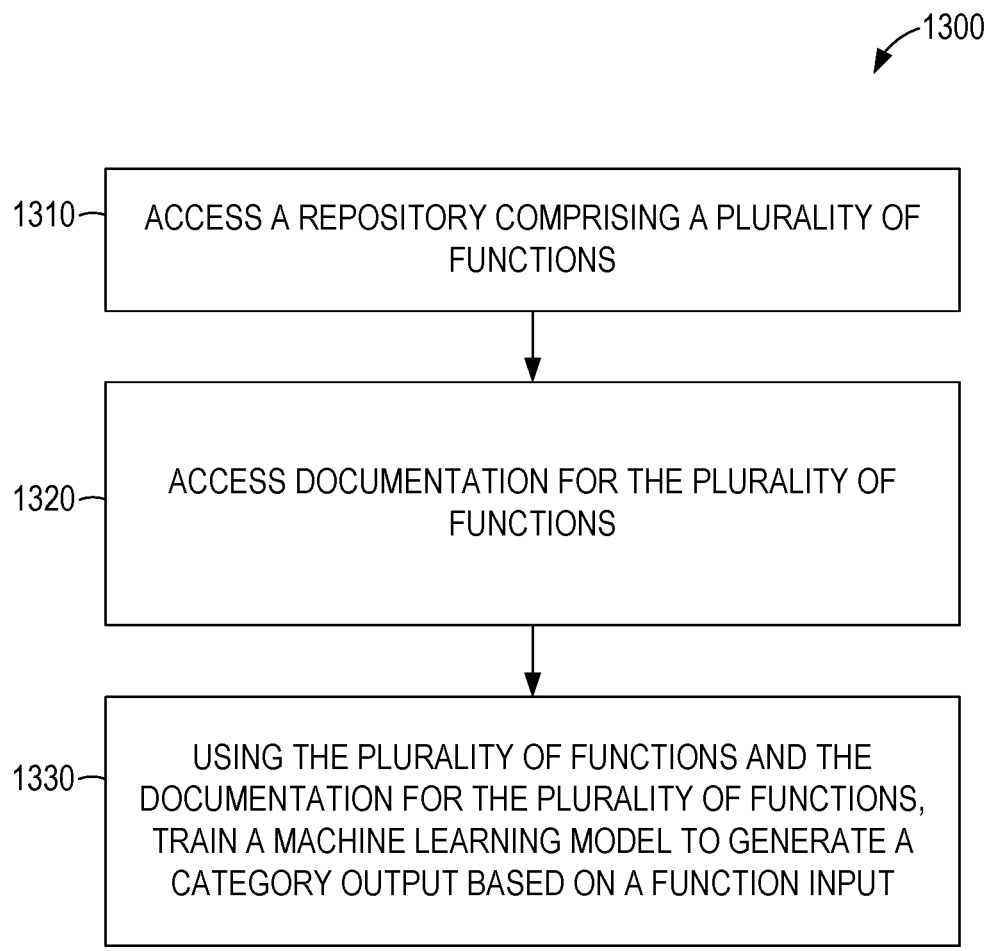
FIG. 13 is a flowchart illustrating operations of an example method suitable for training a machine learning model to generate a category output based on a function input.

FIG. 13 is a flowchart illustrating operations of an example method 1300 suitable for training a machine learning model to generate a category output based on a function input. The method 1300 includes operations 1310, 1320, and 1330. By way of example and not limitation, the method 1300 may be performed by the machine learning server 140 or the machine learning module 260 of the search server 160, using the modules, databases, and structures shown in FIGS. 2-7. The machine learning model generated using the method 1300 may be used to populate the category column of the search table 670.

In operation 1310, the machine learning server 140 accesses a repository comprising a plurality of functions. For example, a repository containing functions written in Java may be accessed from an open-source server. Operation 1310 may be repeated for additional repositories, written in the same or different programming languages.

The machine learning server 140, in operation 1320, accesses documentation for the plurality of functions. Operation 1320 may be repeated for additional repositories, providing additional function/documentation pairs.

In operation 1330, the machine learning server 140, using the plurality of functions and the documentation for the plurality of functions, trains a machine learning model to generate a category output based on a function input. For example, first vector embeddings for the functions may be generated (e.g., using operations 910-940 of the method 900) and second vector embeddings for the documentation may be generated (e.g., using the language embedder 410, trained to generate a vector embedding for natural language input). Using the second vector embeddings as annotations for the first vector embeddings, a machine learning model is trained to generate a documentation vector as output in response to receiving a function vector as input. A reverse language embedder may be trained to translate input vectors into natural language words or phrases. Thus, the documentation vector generated by the trained machine learning model may be converted into a natural language word or phrase using the reverse language embedder.

As a result of the method 1300, a machine learning model is trained to generate a category for source code. This allows source code to be categorized even if the developer did not explicitly identify a category for the source code. Additionally, by use of the resulting machine learning model, a developer may be informed if a category identified by the developer does not match the category generated by the machine learning model. Accordingly, the developer may be prompted to change the category for the source code. The category for the source code, whether generated by the trained machine learning model or by the developer, may be used to select the search results in operation 1230 of the method 1200.

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: automatically translating, by one or more processors, first source code from a first programming language to a second programming language, the first source code comprising a first plurality of functions; generating, based on each function in the translated first source code, an embedding vector for each function of the first plurality of functions; generating, based on each function of a second plurality of functions in second source code in the second programming language, an embedding vector for the function; determining, based on the embedding vectors, a similarity measure between the first source code and the second source code; and causing a user interface to be presented that includes, a similarity measure between the first source code and the second source code.

In Example 2, the subject matter of Example 1 includes, accessing third source code in the first programming language, the third source code comprising a third plurality of functions; accessing fourth source code in the second programming language, the fourth source code comprising a fourth plurality of functions, each function of the fourth plurality of functions annotated with an identifier of a corresponding function of the third plurality of functions; and training, using the third source code and the fourth source code, a machine learning model to translate from the first programming language to the second programming language; wherein the automatically translating of the first source code from the first programming language to the second programming language is performed using the trained machine learning model.

In Example 3, the subject matter of Examples 1-2 includes, based on first images depicting software components for at least a subset of the first plurality of functions, determining a first complexity measure for the first source code; based on second images depicting software components for at least a subset of the second plurality of functions, determining a second complexity measure for the second source code; wherein the user interface includes an indication of the first complexity measure and the second complexity measure.

In Example 4, the subject matter of Examples 1-3 includes, storing, in a database, the embedding vectors for each function of the first plurality of functions and the second plurality of functions; receiving, via a second user interface, a search string; converting the search string to a vector; searching the database for functions having similar vectors to the vector for the search string; based on results of the search, selecting either the first source code or the second source code; and causing a third user interface to be presented, the third user interface identifying the selected source code.

In Example 5, the subject matter of Example 4 includes, generating a complexity score for each function of the first plurality of functions and the second plurality of functions based on documentation for the function; wherein the selecting of either the first source code or the second source code is further based on the complexity scores.

In Example 6, the subject matter of Examples 4-5 includes, generating, based on first test code for the first source code, a first test coverage score for the first source code; and generating, based on second test code for the second source code, a second test coverage score for the second source code; wherein the selecting of either the first source code or the second source code is further based on the first test coverage score and the second test coverage score.

In Example 7, the subject matter of Examples 4-6 includes, training a machine learning model using a plurality of documents describing functionality of source code; and using the trained machine learning model, determining a first category for the first source code and a second category for the second source code; wherein the selecting of either the first source code or the second source code is further based on the first category and the second category.

In Example 8, the subject matter of Examples 1-7 includes, accessing third source code in the second programming language, the third source code comprising a third plurality of functions; generating, based on each function in the third source code, an embedding vector for each function of the third plurality of functions; determining, based on the embedding vectors for the second plurality of functions and the embedding vectors for the third plurality of functions, a project similarity measure between the second source code and the third source code; and causing a second user interface to be presented, the second user interface recommending, based on the project similarity measure, consolidation of the second source code and the third source code.

In Example 9, the subject matter of Examples 1-8 includes, accessing third source code in the second programming language, the third source code comprising a third plurality of functions; generating, based on each function in the third source code, an embedding vector for each function of the third plurality of functions; determining, based on the embedding vectors for the second plurality of functions and the embedding vectors for the third plurality of functions, a project similarity measure between the second source code and the third source code; and causing a second user interface to be presented, the second user interface recommending, based on the project similarity measure, connection of the second source code and the third source code as microservices.

Example 10 is a system comprising: a memory that stores instructions; and one or more processors configured by the instructions to perform operations comprising: automatically translating first source code from a first programming language to a second programming language, the first source code comprising a first plurality of functions; generating, based on each function in the translated first source code, an embedding vector for each function of the first plurality of functions; generating, based on each function of a second plurality of functions in second source code in the second programming language, an embedding vector for the function; determining, based on the embedding vectors, a similarity measure between the first source code and the second source code; and causing a user interface to be presented that includes, a similarity measure between the first source code and the second source code.

In Example 11, the subject matter of Example 10 includes, wherein the operations further comprise: accessing third source code in the first programming language, the third source code comprising a third plurality of functions; accessing fourth source code in the second programming language, the fourth source code comprising a fourth plurality of functions, each function of the fourth plurality of functions annotated with an identifier of a corresponding function of the third plurality of functions; and training, using the third source code and the fourth source code, a machine learning model to translate from the first programming language to the second programming language; wherein the automatically translating of the first source code from the first programming language to the second programming language is performed using the trained machine learning model.

In Example 12, the subject matter of Examples 10-11 includes, wherein the operations further comprise: based on first images depicting software components for at least a subset of the first plurality of functions, determining a first complexity measure for the first source code; based on second images depicting software components for at least a subset of the second plurality of functions, determining a second complexity measure for the second source code; wherein the user interface includes an indication of the first complexity measure and the second complexity measure.

In Example 13, the subject matter of Examples 10-12 includes, wherein the operations further comprise: storing, in a database, the embedding vectors for each function of the first plurality of functions and the second plurality of functions; receiving, via a second user interface, a search string; converting the search string to a vector; searching the database for functions having similar vectors to the vector for the search string; based on results of the search, selecting either the first source code or the second source code; and causing a third user interface to be presented, the third user interface identifying the selected source code.

In Example 14, the subject matter of Example 13 includes, wherein the operations further comprise: generating a complexity score for each function of the first plurality of functions and the second plurality of functions based on documentation for the function; wherein the selecting of either the first source code or the second source code is further based on the complexity scores.

In Example 15, the subject matter of Examples 13-14 includes, wherein the operations further comprise: generating, based on first test code for the first source code, a first test coverage score for the first source code; and generating, based on second test code for the second source code, a second test coverage score for the second source code; wherein the selecting of either the first source code or the second source code is further based on the first test coverage score and the second test coverage score.

In Example 16, the subject matter of Examples 13-15 includes, wherein the operations further comprise: training a machine learning model using a plurality of documents describing functionality of source code; and using the trained machine learning model, determining a first category for the first source code and a second category for the second source code; wherein the selecting of either the first source code or the second source code is further based on the first category and the second category.

In Example 17, the subject matter of Examples 10-16 includes, wherein the operations further comprise: accessing third source code in the second programming language, the third source code comprising a third plurality of functions; generating, based on each function in the third source code, an embedding vector for each function of the third plurality of functions; determining, based on the embedding vectors for the second plurality of functions and the embedding vectors for the third plurality of functions, a project similarity measure between the second source code and the third source code; and causing a second user interface to be presented, the second user interface recommending, based on the project similarity measure, consolidation of the second source code and the third source code.

Example 18 is a non-transitory computer-readable medium that stores instructions that, when executed by one or more processors, cause the one or more processors to perform operations comprising: storing, in a database, embedding vectors for each function of a first plurality of functions of first source code and a second plurality of functions of second source code; receiving, via a second user interface, a search string; converting the search string to a vector; searching the database for functions having similar vectors to the vector for the search string; based on results of the search, selecting either the first source code or the second source code; and causing a third user interface to be presented, the third user interface identifying the selected source code.

In Example 19, the subject matter of Example 18 includes, wherein the operations further comprise: generating a complexity score for each function of the first plurality of functions and the second plurality of functions based on documentation for the function; wherein the selecting of either the first source code or the second source code is further based on the complexity scores.

In Example 20, the subject matter of Examples 18-19 includes, wherein the operations further comprise: generating, based on first test code for the first source code, a first test coverage score for the first source code; and generating, based on second test code for the second source code, a second test coverage score for the second source code; wherein the selecting of either the first source code or the second source code is further based on the first test coverage score and the second test coverage score.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 14:
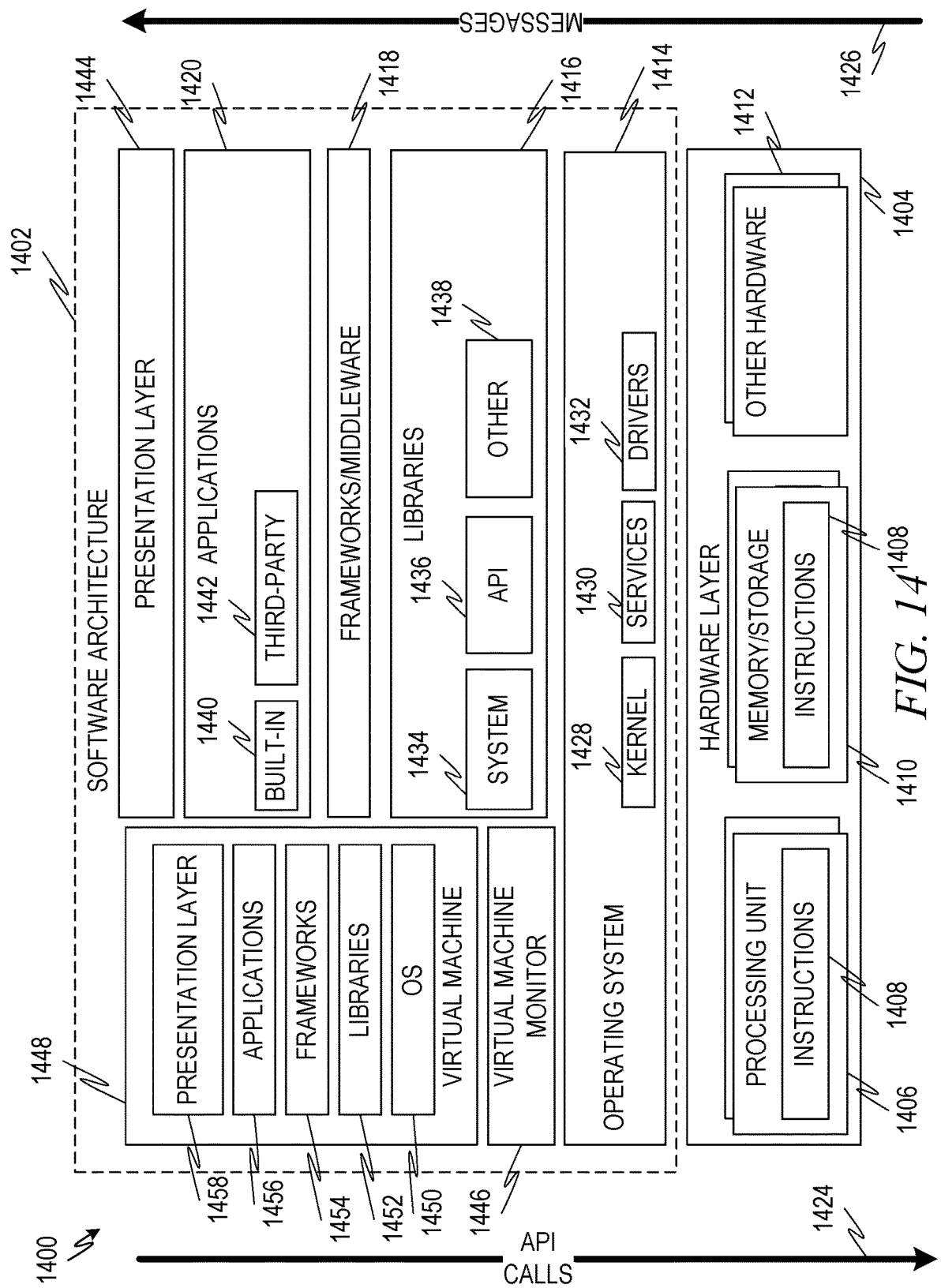
FIG. 14 is a block diagram showing one example of a software architecture for a computing device.

FIG. 14 is a block diagram 1400 showing one example of a software architecture 1402 for a computing device. The architecture 1402 may be used in conjunction with various hardware architectures, for example, as described herein. FIG. 14 is merely a non-limiting example of a software architecture and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system of FIG. 14.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of the software architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and presentation layer 1444. Operationally, the applications 1420 and/or other components within the layers may invoke application programming interface (API) calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 may provide a higher-level common infrastructure that may be utilized by the applications 1420 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any of the built-in applications as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system libraries 1434, API libraries 1436, and other libraries 1438), frameworks/middleware 1418 to create user interfaces to interact with users of the system. Alternatively, or additionally, in some systems, interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine as well as the interface with the host operating system (i.e., operating system 1414). A software architecture executes within the virtual machine 1448 such as an operating system 1450, libraries 1452, frameworks/middleware 1454, applications 1456 and/or presentation layer 1458. These layers of software architecture executing within the virtual machine 1448 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and
Machine-Readable Medium

Figure 15:
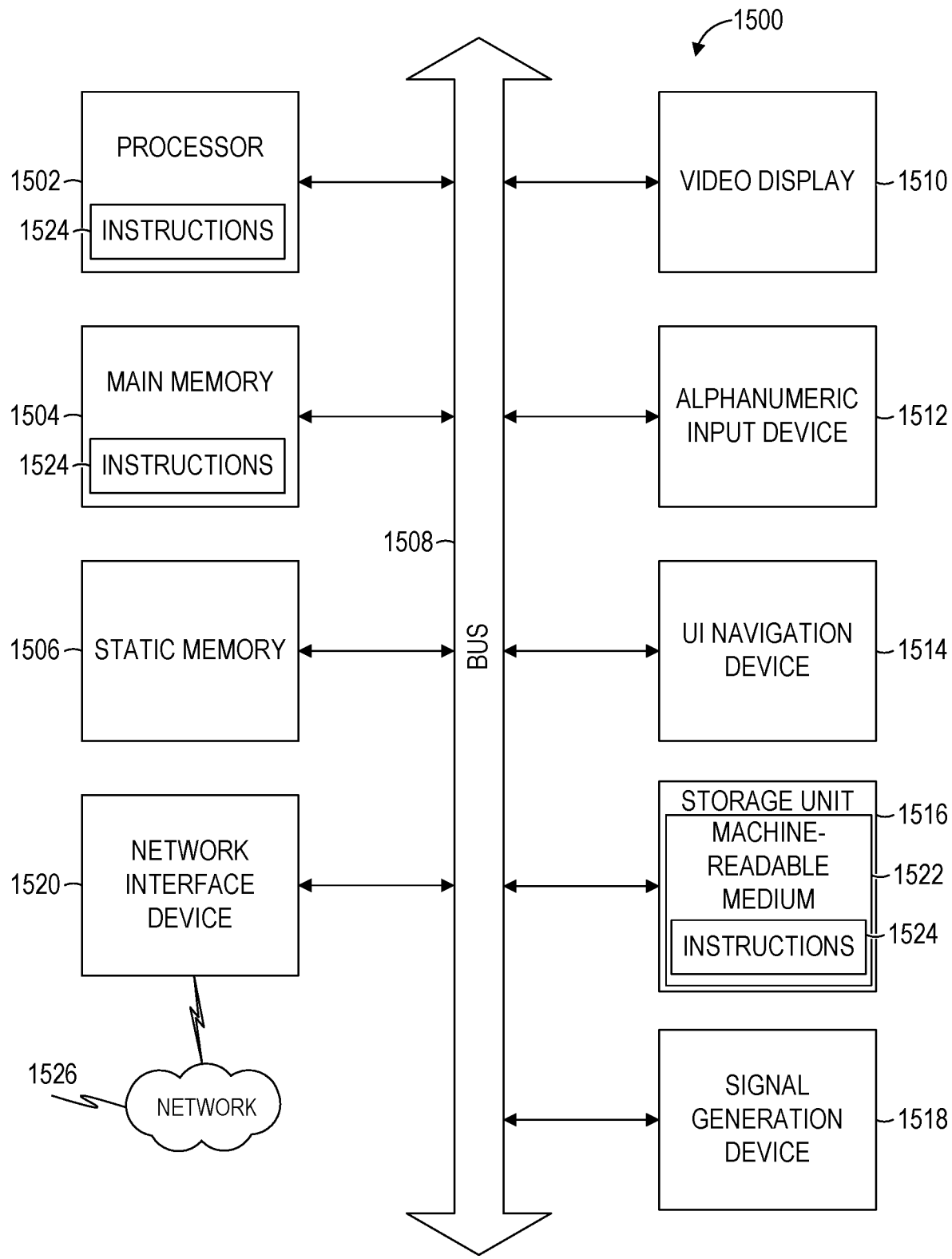
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a storage unit 1516, a signal generation device 1518 (e.g., a speaker), and a network interface device 1520.

Machine-Readable Medium

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in FIG. 15 to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1524 may further be transmitted or received over a communications network 1526 using a transmission medium. The instructions 1524 may be transmitted using the network interface device 1520 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   automatically generating second source code by translating, by one or more processors, first source code from a first programming language to a second programming language, the first source code comprising a first plurality of functions;

generating, based on each function in the second source code, an embedding vector for each function of the first plurality of functions;
generating, based on each function of a second plurality of functions in third source code in the second programming language, an embedding vector for the function;
determining, based on the embedding vectors, a similarity measure between the first source code and the third source code;
causing a user interface to be presented that includes the similarity measure between the first source code and the third source code;
accessing fourth source code in the first programming language, the fourth source code comprising a third plurality of functions;
accessing fifth source code in the second programming language, the fifth source code comprising a fourth plurality of functions, each function of the fourth plurality of functions annotated with an identifier of a corresponding function of the third plurality of functions; and
training, using the fifth source code and the fourth source code, a machine learning model to translate from the first programming language to the second programming language,
wherein the translating of the first source code from the first programming language to the second programming language is performed using the trained machine learning model.

2. The method of claim 1, further comprising:
based on first images depicting software components for at least a subset of the first plurality of functions, determining a first complexity measure for the first source code;
based on second images depicting software components for at least a subset of the second plurality of functions, determining a second complexity measure for the third source code;
wherein the user interface includes an indication of the first complexity measure and the second complexity measure.

3. The method of claim 1, further comprising:
storing, in a database, the embedding vectors for each function of the first plurality of functions and the second plurality of functions;
receiving, via a second user interface, a search string;
converting the search string to a vector;
searching the database for functions having similar vectors to the vector for the search string;
based on results of the search, selecting either the first source code or the third source code; and
causing a third user interface to be presented, the third user interface identifying the selected source code.

4. The method of claim 3, further comprising:
generating a complexity score for each function of the first plurality of functions and the second plurality of functions based on documentation for the function;
wherein the selecting of either the first source code or the third source code is further based on the complexity scores.

5. The method of claim 3, further comprising:
generating, based on first test code for the first source code, a first test coverage score for the first source code; and generating, based on second test code for the third source code, a second test coverage score for the third source code;
wherein the selecting of either the first source code or the third source code is further based on the first test coverage score and the second test coverage score.

6. The method of claim 1, further comprising:
accessing sixth source code in the second programming language, the sixth source code comprising a fifth plurality of functions;
generating, based on each function in the sixth source code, an embedding vector for each function of the fifth plurality of functions;
determining, based on the embedding vectors for the second plurality of functions and the embedding vectors for the fifth plurality of functions, a project similarity measure between the sixth source code and the third source code; and
causing a second user interface to be presented, the second user interface recommending, based on the project similarity measure, consolidation of the sixth source code and the third source code.

7. The method of claim 1, further comprising:
accessing sixth source code in the second programming language, the sixth source code comprising a fifth plurality of functions;
generating, based on each function in the sixth source code, an embedding vector for each function of the fifth plurality of functions;
determining, based on the embedding vectors for the second plurality of functions and the embedding vectors for the fifth plurality of functions, a project similarity measure between the sixth source code and the third source code; and
causing a second user interface to be presented, the second user interface recommending, based on the project similarity measure, consolidation of the sixth source code and the third source code.

8. A system comprising:
a memory that stores instructions; and
one or more processors configured by the instructions to perform operations comprising:
automatically generating second source code by translating first source code from a first programming language to a second programming language, the first source code comprising a first plurality of functions;
generating, based on each function in the second source code, an embedding vector for each function of the first plurality of functions;
generating, based on each function of a second plurality of functions in third source code in the second programming language, an embedding vector for the function;
determining, based on the embedding vectors, a similarity measure between the first source code and the third source code;
causing a user interface to be presented that includes the similarity measure between the first source code and the third source code;
accessing fourth source code in the first programming language, the fourth source code comprising a third plurality of functions;
accessing fifth source code in the second programming language, the fifth source code comprising a fourth plurality of functions, each function of the fourth plurality of functions annotated with an identifier of a corresponding function of the third plurality of functions; and training, using the fifth source code and the fourth source code, a machine learning model to translate from the first programming language to the second programming language, wherein the translating of the first source code from the first programming language to the second programming language is performed using the trained machine learning model.

9. The system of claim 8, wherein the operations further comprise:

based on first images depicting software components for at least a subset of the first plurality of functions, determining a first complexity measure for the first source code;

based on second images depicting software components for at least a subset of the second plurality of functions, determining a second complexity measure for the third source code;

wherein the user interface includes an indication of the first complexity measure and the second complexity measure.

10. The system of claim 8, wherein the operations further comprise:

storing, in a database, the embedding vectors for each function of the first plurality of functions and the second plurality of functions;

receiving, via a second user interface, a search string;

converting the search string to a vector;

searching the database for functions having similar vectors to the vector for the search string;

based on results of the search, selecting either the first source code or the third source code; and causing a third user interface to be presented, the third user interface identifying the selected source code.

11. The system of claim 10, wherein the operations further comprise:

generating a complexity score for each function of the first plurality of functions and the second plurality of functions based on documentation for the function;

wherein the selecting of either the first source code or the third source code is further based on the complexity scores.

12. The system of claim 10, wherein the operations further comprise:

generating, based on first test code for the first source code, a first test coverage score for the first source code; and generating, based on second test code for the third source code, a second test coverage score for the third source code;

wherein the selecting of either the first source code or the third source code is further based on the first test coverage score and the second test coverage score.

13. The system of claim 8, wherein the operations further comprise:

accessing sixth source code in the second programming language, the sixth source code comprising a fifth plurality of functions;

generating, based on each function in the sixth source code, an embedding vector for each function of the fifth plurality of functions;

determining, based on the embedding vectors for the second plurality of functions and the embedding vectors for the fifth plurality of functions, a project similarity measure between the sixth source code and the third source code; and causing a second user interface to be presented, the second user interface recommending, based on the project similarity measure, consolidation of the sixth source code and the third source code.

14. A non-transitory computer-readable medium that stores instructions that, when executed by one or more processors, cause the one or more processors to perform operations comprising:

automatically generating second source code by translating first source code from a first programming language to a second programming language, the first source code comprising a first plurality of functions;

generating, based on each function in the second source code, an embedding vector for each function of the first plurality of functions;

generating, based on each function of a second plurality of functions in third source code in the second programming language, an embedding vector for the function;

determining, based on the embedding vectors, a similarity measure between the first source code and the third source code;

causing a user interface to be presented that includes the similarity measure between the first source code and the third source code;

accessing fourth source code in the first programming language, the fourth source code comprising a third plurality of functions;

accessing fifth source code in the second programming language, the fifth source code comprising a fourth plurality of functions, each function of the fourth plurality of functions annotated with an identifier of a corresponding function of the third plurality of functions; and training, using the fifth source code and the fourth source code, a machine learning model to translate from the first programming language to the second programming language, wherein the translating of the first source code from the first programming language to the second programming language is performed using the trained machine learning model.

15. The non-transitory computer-readable medium of claim 14, wherein the operations further comprise:

generating a complexity score for each function of the first plurality of functions and the second plurality of functions based on documentation for the function;

storing, in a database, the embedding vectors for each function of the first plurality of functions and the second plurality of functions;

receiving, via a second user interface, a search string;

converting the search string to a vector;

searching the database for functions having similar vectors to the vector for the search string;

based on results of the search and the complexity scores, selecting either the first source code or the third source code; and causing a third user interface to be presented, the third user interface identifying the selected source code.

16. The non-transitory computer-readable medium of claim 15, wherein the operations further comprise:

generating, based on first test code for the first source code, a first test coverage score for the first source code; and generating, based on second test code for the third source code, a second test coverage score for the third source code;

wherein the selecting of either the first source code or the third source code is further based on the first test coverage score and the second test coverage score.

17. The non-transitory computer-readable medium of claim 14, wherein the operations further comprise:

accessing sixth source code in the second programming language, the sixth source code comprising a fifth plurality of functions;

generating, based on each function in the sixth source code, an embedding vector for each function of the fifth plurality of functions;

determining, based on the embedding vectors for the second plurality of functions and the embedding vectors for the fifth plurality of functions, a project similarity measure between the sixth source code and the third source code; and causing a second user interface to be presented, the second user interface recommending, based on the project similarity measure, consolidation of the sixth source code and the third source code.

18. The non-transitory computer-readable medium of claim 14, wherein the operations further comprise:

based on first images depicting software components for at least a subset of the first plurality of functions, determining a first complexity measure for the first source code;

based on second images depicting software components for at least a subset of the second plurality of functions, determining a second complexity measure for the third source code;

wherein the user interface includes an indication of the first complexity measure and the second complexity measure.

19. The non-transitory computer-readable medium of claim 14, wherein the operations further comprise:

storing, in a database, the embedding vectors for each function of the first plurality of functions and the second plurality of functions;

receiving, via a second user interface, a search string;

converting the search string to a vector;

searching the database for functions having similar vectors to the vector for the search string;

based on results of the search, selecting either the first source code or the third source code; and causing a third user interface to be presented, the third user interface identifying the selected source code.

20. The non-transitory computer-readable medium of claim 14, wherein the operations further comprise:

accessing sixth source code in the second programming language, the sixth source code comprising a fifth plurality of functions;

generating, based on each function in the sixth source code, an embedding vector for each function of the fifth plurality of functions;

determining, based on the embedding vectors for the second plurality of functions and the embedding vectors for the fifth plurality of functions, a project similarity measure between the sixth source code and the third source code; and causing a second user interface to be presented, the second user interface recommending, based on the project similarity measure, connection of the sixth source code and the third source code as microservices.

* * * * *